(12) United States Patent
Rachitsky et al.

(10) Patent No.: US 8,005,890 B2
(45) Date of Patent: Aug. 23, 2011

(54) SYSTEM AND METHOD FOR OBTAINING AND EXECUTING INSTRUCTIONS FROM A PRIVATE NETWORK

(75) Inventors: Lenny Rachitsky, Solana Beach, CA (US); Tim Drees, Del Mar, CA (US); Douglas Taylor, Solana Beach, CA (US)

(73) Assignee: NeuStar, Inc., Sterling, VA (US)

( * ) Notice: Subject to any disclaimer, the term of this patent is extended or adjusted under 35 U.S.C. 154(b) by 718 days.

(21) Appl. No.: 11/537,740

(22) Filed: Oct. 2, 2006

(65) Prior Publication Data

US 2008/0082645 A1    Apr. 3, 2008

(51) Int. Cl.
*G06F 15/16* (2006.01)
(52) U.S. Cl. ......... 709/202; 709/203; 709/217; 709/219
(58) Field of Classification Search .................. 709/202, 709/203, 217, 219
See application file for complete search history.

(56) References Cited

U.S. PATENT DOCUMENTS

| | | | |
|---|---|---|---|
| 6,173,311 B1 * | 1/2001 | Hassett et al. ................. | 709/202 |
| 6,493,447 B1 * | 12/2002 | Goss et al. ............... | 379/265.09 |
| 6,611,498 B1 * | 8/2003 | Baker et al. .................... | 370/252 |
| 6,714,979 B1 * | 3/2004 | Brandt et al. .................. | 709/225 |
| 6,959,393 B2 * | 10/2005 | Hollis et al. .................... | 726/21 |
| 7,099,947 B1 * | 8/2006 | Nadeau et al. ................. | 709/229 |
| 7,437,442 B2 * | 10/2008 | Ashiya .......................... | 709/223 |
| 7,441,036 B2 * | 10/2008 | Bomer et al. .................. | 709/228 |
| 7,444,505 B2 * | 10/2008 | Burcham et al. .............. | 713/153 |
| 2002/0078382 A1 * | 6/2002 | Sheikh et al. .................. | 713/201 |
| 2004/0073642 A1 * | 4/2004 | Iyer ................................. | 709/223 |
| 2005/0198125 A1 * | 9/2005 | Macleod Beck et al. ..... | 709/204 |
| 2007/0168514 A1 * | 7/2007 | Cocotis et al. ................. | 709/225 |
| 2007/0244974 A1 * | 10/2007 | Chasin .......................... | 709/206 |
| 2008/0126557 A1 * | 5/2008 | Motoyama et al. ........... | 709/232 |

* cited by examiner

*Primary Examiner* — Phuoc Nguyen
(74) *Attorney, Agent, or Firm* — Pattric J. Rawlins; Procopio Cory Hargreaves & Savitch LLP

(57) ABSTRACT

Systems and methods for website and application monitoring and testing inside from a private network are presented. An agent module resident on an agent device inside the secured network periodically sends an HTTP message to a controller server and receives an HTTP response. The agent module parses out a set of instructions from the content of the HTTP response and executes the instructions. The agent module collects and compiles responsive information resulting from the instructions being executed and sends the compiled information to the controller server for storage and reporting.

26 Claims, 7 Drawing Sheets

SYSTEM AND METHOD FOR OBTAINING AND EXECUTING INSTRUCTIONS FROM A PRIVATE NETWORK

BACKGROUND

1. Field of the Invention

The present invention generally relates to the field of website and application performance monitoring and testing and more particularly relates to the field of website and application monitoring and testing from a private network.

2. Related Art

Conventional website or application performance monitoring and testing solutions address the need for web enabled businesses to measure the speed and reliability of their websites and applications as seen by a global audience accessing them over the internet. There are two types of conventional solutions, namely conventional external and conventional internal solutions. Conventional external solutions lack the ability to access websites or applications which are resident on a customer's internal private network due to the fact that these internal private networks are protected by a firewall or other security system. In addition, conventional external solutions can not monitor and test from the point of view of the private network to websites or applications which are hosted outside the internal private network, for example via the Internet.

Conventional internal solutions suffer from the same limitations as traditional delivered solutions and are additionally problematic because they require a large, complex software installation with trained and dedicated staff to maintain them. One cumbersome solution that has been suggested to address these significant drawbacks of the conventional solutions is to provide a server inside the protected network. This requires a considerable amount of time to set up, configure, and maintain. This additionally requires the customer to spend a lot of time learning how to operate the server, including its software and hardware components. This type of solution also requires direct access to the private network. There are no existing solutions that can externally monitor a website or application that is located beyond a firewall or security system in a private network. Therefore, the industry has defined a need for a system and method that overcomes these significant problems found in the conventional systems as described above.

SUMMARY

Accordingly, systems and methods for executing instructions behind a firewall are described herein that allow for monitoring and testing of websites or applications resident on private networks and further do not require complex proprietary solutions. A system for internal execution of instructions on a protected network is configured to install and execute an agent module on one or more agent devices that are placed within the protected network. The agent module is deployed in a native environment emulator that allows the agent module to operate on a variety of agent devices running a variety of different operating systems. This allows different agent modules that are running on different agent devices with different operating systems to execute the same agent instructions in the same compiled or interpreted language.

When the agent is initially deployed it generates a unique identifier that it sends to a controller server located outside the private network. The controller server maintains a set of instructions to be executed by the agent module. Periodically, the agent sends a message to the controller server requesting instructions for execution. In response, the agent receives instructions from the controller server. The instructions are downloaded as part of an Hyper Text Transfer Protocol ("HTTP") response in an inbound direction so that they may pass through the firewall or other protections of the private network where otherwise agents in a secure network can not otherwise be typically contacted. The instructions received by the agent can be interpreted code, compiled code, pseudo code, script, operating system ("OS") commands (including shell commands), or application programming interface ("API") commands.

Execution of the instructions cause the agent to monitor a website inside or outside the private network, monitor an application inside or outside the private network, perform testing on a website or application inside or outside the private network, carry out administrative functions on the agent device, execute arbitrary instructions, etc. For example, upgrades and improvements to the agent module itself may also be made by sending the appropriate instructions and updates to the agent module. The results of the executed instructions by are recorded by the agent module and sent back to the controller server for storage and reporting.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods to monitor and test websites and applications located in a private network but controlled by processes (programs) running outside the private network. For example, one method as disclosed herein allows for a controller server to cause monitoring or testing agents on various agent devices deployed in private networks to execute a set of monitoring or testing instructions. The agents send an HTTP request to the controller server. In response, the controller server sends instructions embedded in the responsive content. The agent parses the responsive content to obtain the instructions and then executes the instructions and collects the results, which are then provided to the controller server.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Furthermore, as used herein, the terms monitoring and testing may comprise any sort of communications with a target device and also include active or passive gathering of information from a target device. Some examples of monitoring and testing include gathering status information, load testing, functionality testing, application testing, regression testing, or the like. Additionally, the term "interrogating" may also be used to mean all types of monitoring or testing that may be used.

Figure 1:
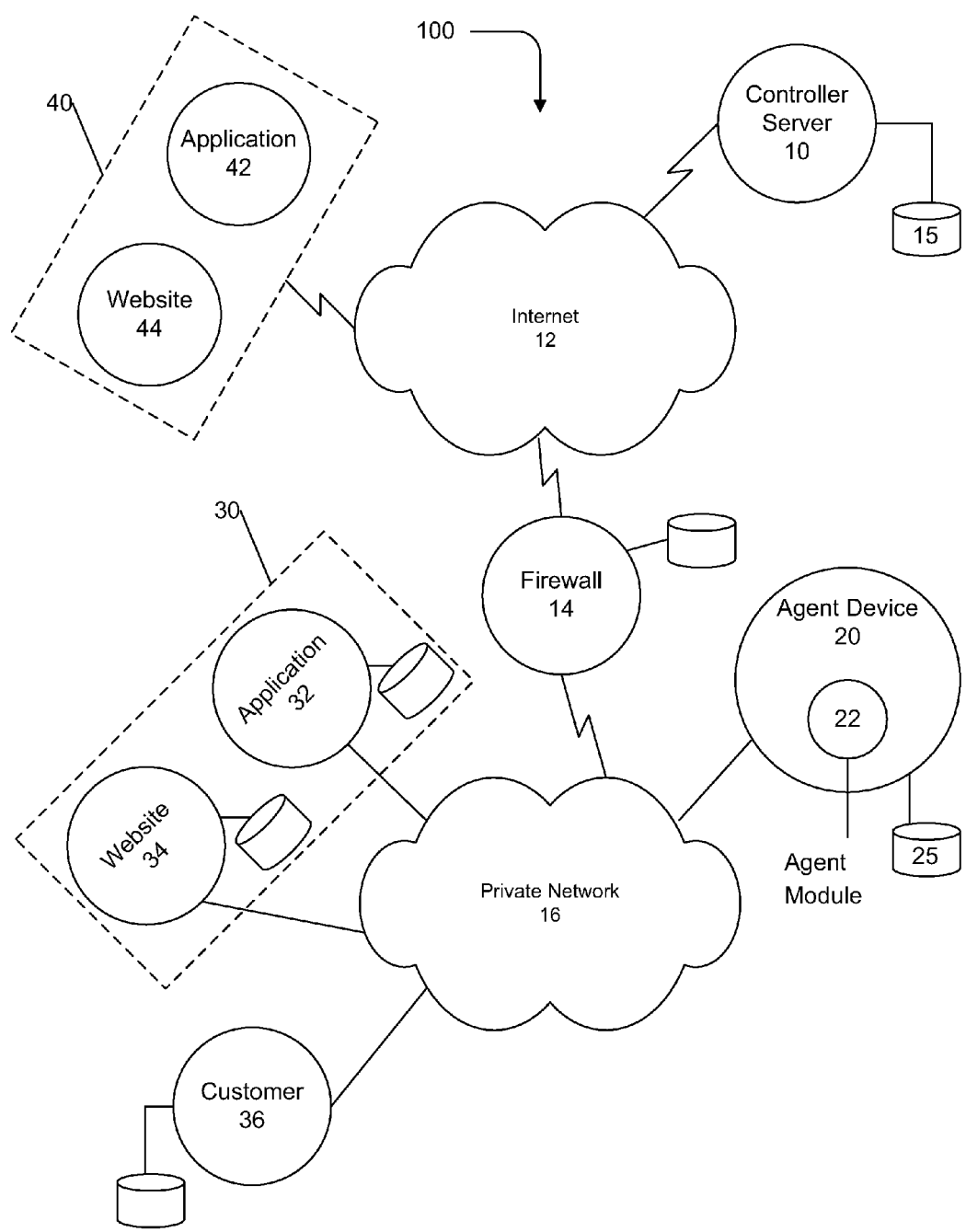
FIG. 1 is a high level network diagram illustrating an example system for executing instructions on a private network according to an embodiment of the present invention.

FIG. 1 is a high level network diagram illustrating an example system for executing instructions on a private network according to an embodiment of the present invention. In the illustrated embodiment, the system 100 comprises a controller server 10 with an associated data storage area 15, the internet 12, a firewall 14, private network 16, an agent device 20 with an associated agent module 22 and associated data storage area 25, a customer 36 with an associated data storage area, a website 34 with associated data storage area, and an application 32 with associated data storage area. In one embodiment, the website 34 and application 32 may run on a single server 30. The system 100 additionally includes an external network 40 that includes one or more applications 42 and one or more websites 44, each of which may also be configured with a data storage area (not shown) and which may similarly be run on a single server (not shown).

In one embodiment, there can be multiple agent modules 22 in each agent device 20. There can further be multiple agent devices 20 in each private network 16. Each agent device is provided with a data storage area such as the illustrated data storage area 25. Each of the various agent devices 20 can be any sort of computing device that is capable of carrying out instructions and communicating over a network.

The controller server 10 maintains a set of instructions for each agent module 22. For example, one agent module may be tasked with monitoring an internal website while a second agent module in the same private network may be tasked with monitoring an internal application. Accordingly, one or more agent modules may be employed to carry out monitoring of websites 34 and applications 32 inside or outside private network 16. The instructions can include scripts, OS commands, compiled instructions, or references to executable scripts or programs already stored on the agent device 20.

In one embodiment, the controller server 10 responds to the request by the agent module 22 by sending the instructions as Extensible Markup Language ("XML") content through the Internet 12, through the firewall 14 and into the private network 16 where the agent device 20 is located. The instructions are able to pass through the firewall 14 or other protective barrier because they are communicated over the HTTP protocol in a inbound direction. In alternative embodiments, the instructions can be delivered in formats other than XML.

The agent module 22 parses XML content to obtain the instructions from the server 10 and executes the instructions to carry out monitoring or testing of the website 34 or application 32. In one embodiment the application 32 can be part of a website 34 and resident on the same server 30. Alternatively, there can be multiple applications 32 and websites 34 on one server 30. The separate applications 32 and websites 34 can also be on separate servers. In one embodiment the instructions provided from the server 10 can be interpreted instructions, OS commands or compiled instructions. Advantageously, the instructions can be executed inside the private network 16 to monitor or test websites or applications that are resident inside or outside the native environment provided by the agent module 22. In one embodiment, testing of websites can include load testing, functionality testing, regression testing, or the like.

The private network 16 may be any of a variety of private or public networks. The private network 16 may be a packet switched network or a circuit switched network. The private network 16 may be a personal area network ("PAN"), local area network ("LAN") or a wide area network ("WAN") and may be implemented over a wired or wireless physical network medium, it may also be any combination of networks. The private network 16 may also be a voice network or a data network or a combination o the two.

The agent module 22 sends a request to the controller server 10. In one embodiment, the request is advantageously sent as an HTTP POST, which provides a free form structure to the request and is unlikely to be quarantined or otherwise restricted by the security efforts implemented to protect private network 16. This is the request made by the agent module to the controller server asking what to do (i.e. what instructions to execute). An example post is as follows:

POST <http://www.webmetrics.com/results.cgi>
Content-Length: 540
Content-Type: application/x-www-form-urlencoded
Agentname=AGENT_ONE&password=secret-password&xml=<xml>&action=results In response to its request, the agent module 22 receives a series of instructions from the controller server 10 and executes those instructions. The results of the execution of those instructions are then collected by the agent module 22 and provided to the controller server. In one embodiment the agent module provides the results of the execution via an HTTP post. For example, the HTTP post may use a multipart/form-data content type. This type of post can have a variety of formatting types and can advantageously include binary data for more than one key/value form data elements.

In one embodiment, an agent module 22 is wrapped in a native environment emulator. This emulator allows the agent module 22 to execute instructions on any type of agent device 20 running on any type of operating system. In one embodiment the operating system of the agent device 20 may be Windows, Linux or DOS. The agent module 22 is installed in the agent device 20 and the emulator runs in the native operating system of the agent device 20. Accordingly, the instructions sent by the server 10 can be, for example, executable instructions under Linux and the emulator is advantageously configured to execute instructions under Linux regardless of the native operating system of the agent device 20. For example, the instructions from the server 10 can be Linux Perl script instructions and the native operating system of the agent device 20 is a Windows operating system. The emulator allows the Linux Perl instructions to execute on the agent device 20.

In one embodiment multiple agent modules 22 can be deployed on the private network 16. Once an agent module 22 is deployed it self generates an identifier. The agent module 22 sends its identifier to the controller server 10. Each agent module 22 in the system has its own unique identifier which is tracked by the controller server 10 and used to facilitate operations.

The customer 36 may view certain reports regarding the monitoring or other tasks performed by the various agent modules 22. The customer accesses this information at the controller server 10, as the controller server has compiled all the results received from an agent module 22 over time. For example, the results of instructions executed by an agent module are sent to the controller server 10 where they are stored and compiled in to reports. A customer 36 may connect to the controller server 10 (or some related server with access to the reporting data) and view the reports of the monitoring and testing performed by the agent modules 22. The agent module 22 may also be used to monitor one or more externally hosted websites 44 or applications 42 that are hosted on a network 40 that is accessible via the Internet 12.

In one embodiment, a service provider who operates network 40 and provides an application 42 or website 44 to its customer 36 via the Internet 12 may have the customer 36 deploy the agent module 22 on the private network 16 in order to monitor the quality of service level provided by the operator of network 40 and its respective applications 42 or websites 44. Advantageously, this provides the operator of network 40 with a customer-centric view to the quality of service being provided and also facilitates an understanding of the location of any problems associated with the use of the applications 42 or websites 44 experienced within the private network 16.

In one embodiment an example implementation includes a large company with 1000 sales representatives, 800 of which are located in the corporate headquarters office and 200 who are remote sales representatives and located in major cities around the globe. In FIG. 1, the company is represented by customer 36. The company uses a remotely hosted software-as-a-service ("SaaS") customer relationship management ("CRM") solution such as the popular SalesForce.com service. This type of hosted SaaS CRM service is not installed on computers at the company headquarters but is instead installed on service provider (e.g., SalesForce.com) computers and is accessed by the company via the Internet 12. In FIG. 1, the service provider is the operator of the network 40.

In our example, the company spends roughly one million dollars per year on the hosted SaaS CRM service, and therefore the company is keenly interested in how the CRM service performs at the company headquarters (i.e., for its 800 sales representatives in the corporate office). The company is also very interested in how the CRM service performs from remote locations around the globe via the Internet (i.e., for its 200 sales representatives outside the corporate office).

Advantageously, the company can install the agent module 22 in the corporate office location and configure the agent module 22 to periodically monitor and test the quality of the connection to the SaaS CRM service and certain metrics of the user experience with the SaaS CRM service which is accessed via the Internet 12. If the quality of the connection is determined to be low or the user experience determined to be unsatisfactory, the agent module 22 is configured to send an alert to the controller server 10. The controller server 10 advantageously correlates the alert from agent module 22 with all other alerts and data that has been gathered from around the globe (not just the location of the company corporate office) to determine if the low quality connection or unsatisfactory user experience with the network 40 is an isolated issue at the company headquarters or a more widespread issue with the SaaS CRM service. Advantageously, data from all aspects of the SaaS CRM service provided by the operator of network 40 can be correlated with all other data about any of the services provided by the operator of network 40. Thus, the correlation and determination is not just based on information related to the SaaS CRM service used by the company.

Figure 2:
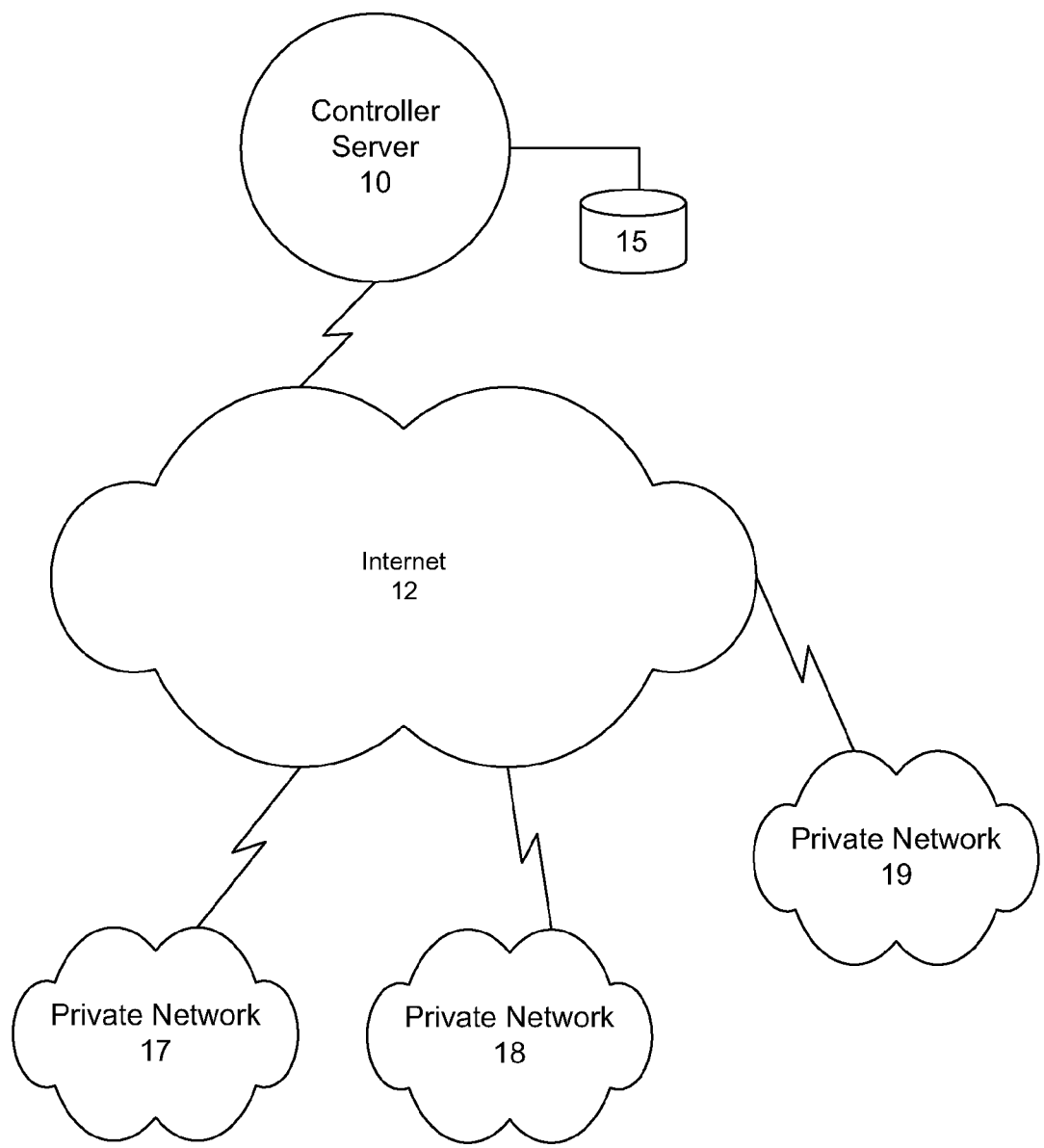
FIG. 2 is a high level network diagram illustrating an example system for executing instructions multiple private networks according to an embodiment of the present invention.

FIG. 2 is a high level network diagram illustrating an example system for executing instructions inside or outside of multiple private networks according to an embodiment of the present invention. In the illustrated embodiment, the system comprises a plurality of private networks including 17, 18, and 19. Each private network may be physically situated in a different geographic location and be owned/operated by different entities. In one embodiment, the controller server 10 monitors a significant number of private networks via the internet 12, each of which may contain multiple agent devices and agent modules.

Figure 3:
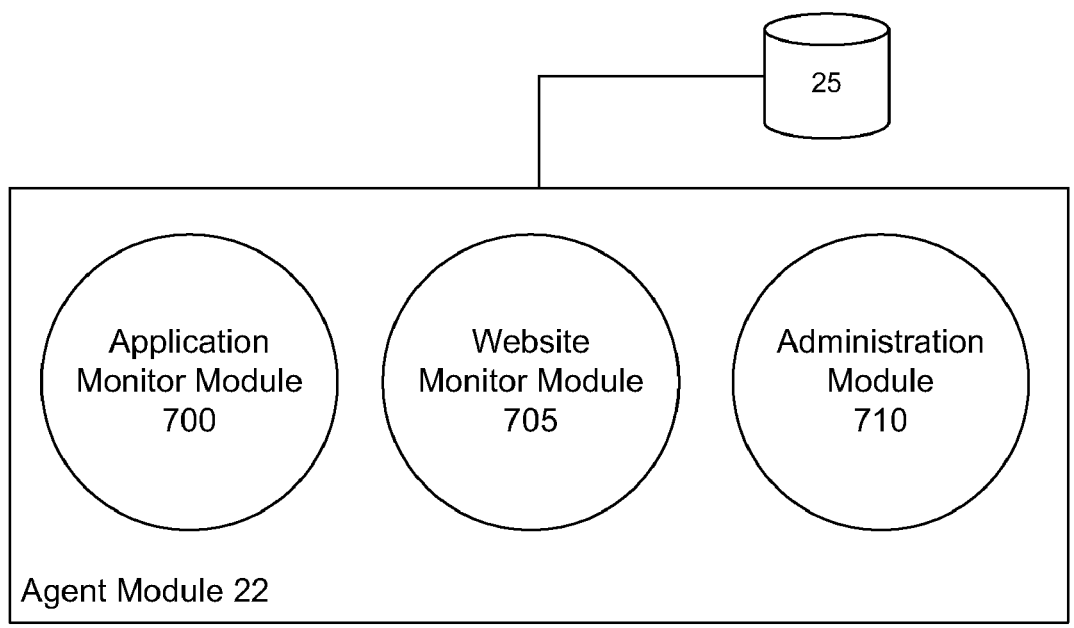
FIG. 3 is a block diagram illustrating an example agent module according to an embodiment of the present invention.

FIG. 3 is a block diagram illustrating an example agent module 22 according to an embodiment of the present invention. In the illustrated embodiment, the agent module 22 comprises an application monitor module 700, a website monitor module 705, and an administration module 710. The agent module 22 also has access to a data storage area 25. The agent module 22 acts as a controller for the application monitor module 700, website monitor module 705, and the administrator module 710. In one embodiment there may be multiple website monitor modules 700 and multiple application monitor modules 705 which monitor a number of applications and websites within the private network. For example, the application monitor module 700 processes instructions to monitor applications which are running on or outside the private network. Similarly, the website monitor module 705 processes instructions to monitor websites which are running on the private network. In one embodiment the website monitor module 705 executes a script of user actions that simulate a website testing or monitoring sequence.

The administrator module 710 generates a unique identifier upon initial execution and sends the identifier to the controller server. The administration module 710 receives either compiled instructions, scripts, OS commands, or the like from the controller server. In one embodiment the scripts can be OS scripts or interpreted scripts. The administration module 710 executes the scripts or compiled instructions.

Figure 4:
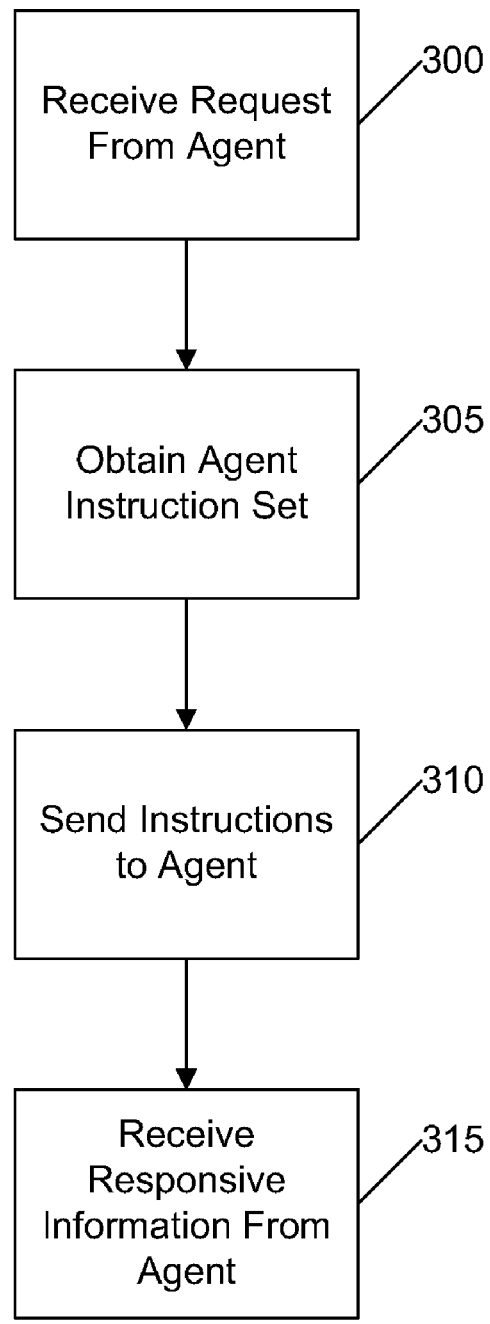
FIG. 4 is a high level flow diagram illustrating an example process for executing instructions on private network according to an embodiment of the present invention.

FIG. 4 is a high level flow diagram illustrating an example process for executing instructions on a private network according to an embodiment of the present invention. This process may be implemented by a controller server in a system such as that previously described with respect to FIG. 1. At step 300 the controller server receives a request from an agent module. For example, multiple agent modules may be deployed in various cities around the world such as London, Paris, and New York. Each agent module is resident on an agent device within a private network. In one embodiment, the request from an agent module comprises a unique identifier for the particular agent module so that the controller server can determine what set of instructions to send to the agent module in response to the request.

At step 305 the request from the agent module is parsed to obtain the unique identifier of the agent module. Once the unique identifier for the agent module is known, the controller server uses the identifier to look up the appropriate instructions for that agent module. For example, one agent module may receive instructions for monitoring a website while another agent module may receive instructions for testing an application, while a third agent module may receive instructions to update the application monitor module.

The instructions obtained by the controller server for the agent module can be compiled instructions (e.g., an executable program) or script commands to be interpreted and thereby executed at the agent module. At step 310 the set of instructions is sent to the agent module. Advantageously, the instructions are sent as part of an response to the request from the agent module.

At step 315 responsive information is received from the agent module. For example, the instructions sent to the agent module may cause the agent module to perform monitoring of a website and the results generated by that monitoring are collected by the agent module and returned to the controller server. This collected information that is compiled by the agent module as a result of executing the instructions sent at step 310 are what is received by the controller server in step 315. Advantageously, this information can be maintained and stored at the controller server so that it may be compiled with similar information and presented to a customer by way of an interactive report delivered via a browser interface, for example.

Figure 5:
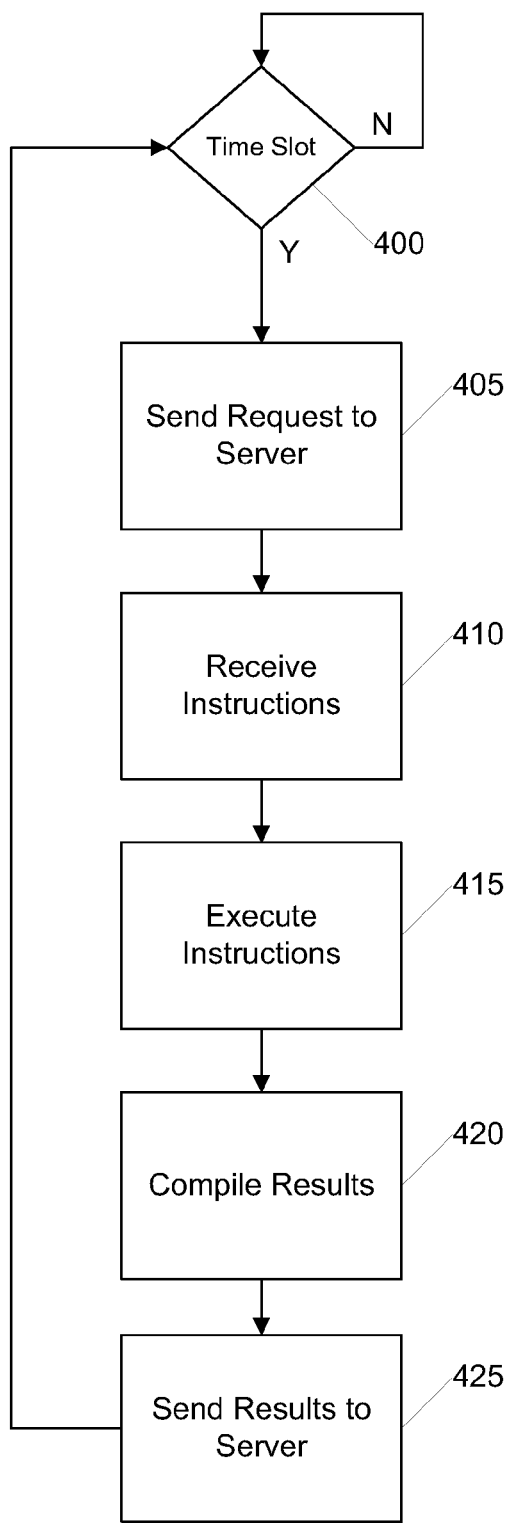
FIG. 5 is a detailed flow diagram illustrating an example process for executing instructions on a private network according to an embodiment of the present invention.

FIG. 5 is a detailed flow diagram illustrating an example process for executing instructions on a private network according to an embodiment of the present invention. This process may be implemented by an agent module in a system such as that previously described with respect to FIG. 1. Initially, an agent module monitors for the arrival of a timeslot in which it is preconfigured to send a message to the controller server. When the timeslot arrives, as determined in step 400, the agent module sends a message to the controller server in step 405, the message comprising a unique identifier for the agent module and requesting instructions from the controller server.

The controller server receives the request and obtains a set of instructions for the particular agent module associated with the unique identifier and provides those instructions in response to the request. Next, at step 410 the agent module receives the instructions from the controller server. In one embodiment, the instructions are interpreted script commands that are provided as content in the response from the controller server.

At step 415 the agent module parses out the instructions from the content and then executes the instructions. In response to the execution of the instructions, the agent module may receive certain data and other information related to the execution of the instructions. This data and other information is compiled by the agent module in step 420 and then sent to the controller server in step 425. Advantageously, the controller server may maintain this responsive information in a data storage area and compile reports and other presentations based on the responsive information in combination with other responsive information from the same agent module or from multiple agent modules.

Figure 6:
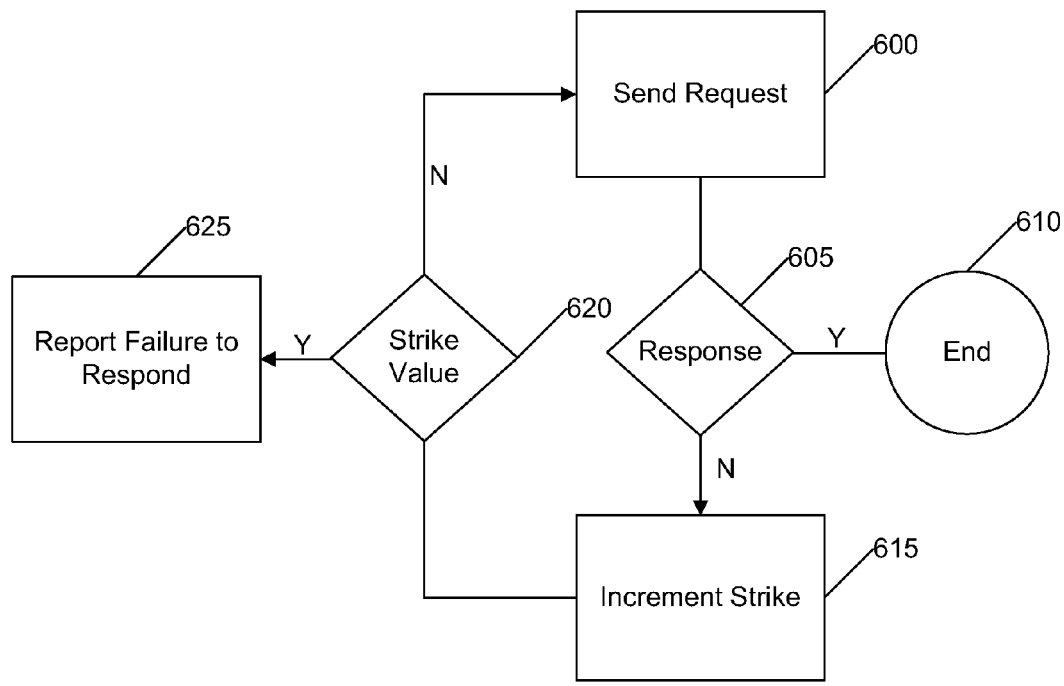
FIG. 6 is a flow diagram illustrating an example process for identifying a non-responsive agent module according to an embodiment of the present invention.

FIG. 6 is a flow diagram illustrating an example process for identifying a non-responsive agent module according to an embodiment of the present invention. This process may be implemented by a controller server in a system such as that previously described with respect to FIG. 1. In the illustrated process, the controller server monitors the various agent modules that have received instructions from the controller server. In one implementation, this ensures that the monitored or tracked web sites and applications are up and running within a defined threshold. Initially, in step 600 a set of instructions is sent to an agent module. At step 605 the system determines whether a response has been received from the agent module. If a successful response is received, as determined in step 605, the process proceeds to step 610 where it ends, although the process begins anew each time the controller server sends a set of instructions to an agent module.

If an error response is received from the agent module, as determined in step 605, the process proceeds to step 615 where a strike count is incremented. The strike count is maintained to keep track of how many error responses have been received from a particular agent module for a specific target. Advantageously, the number of strikes that will elicit a failure to respond error message can be a configurable parameter that is set by the customer. At step 620 the strike count is compared to the strike value, which is the configurable parameter set by an administrator. If the strike count is equal to the strike value, then the predetermined number of error responses has been met. If the predetermined number of error responses has been met, a failure to respond error message is sent as shown in step 625. If the strike count is less than the strike value, as determined in step 620, then the threshold number of error responses has not been reached and the process proceeds back to step 600 where the set of instructions are resent by the controller server to an agent module. The process continues until a successful response is received or a failure to respond error message is sent.

Advantageously, in one embodiment this process allows the overall system to operate under a software as a service model and provide the majority of the functionality in the system at a centralized server while the various agent modules that are deployed in the field can be utilitarian and executable on a variety of device platforms.

Figure 7:
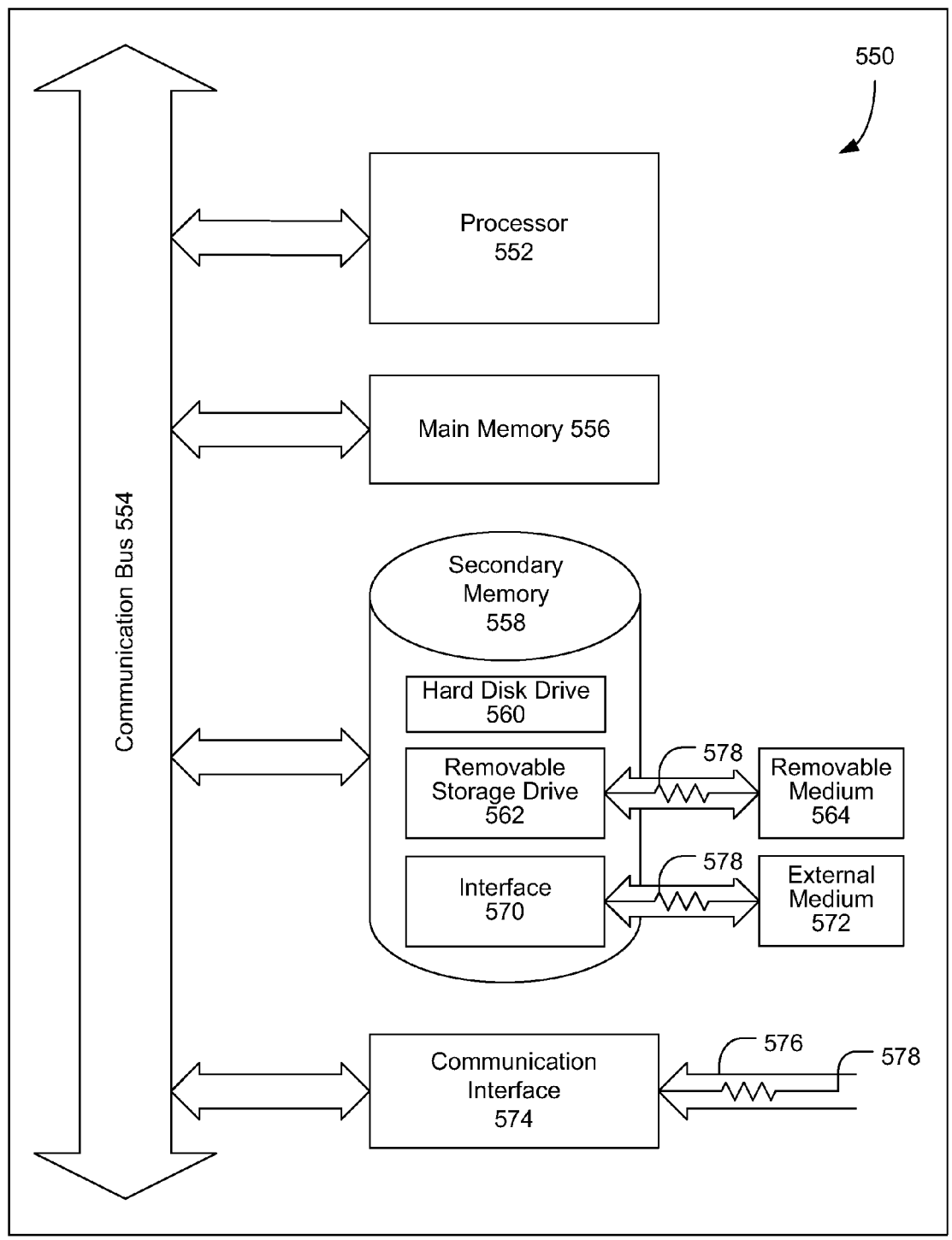
FIG. 7 is a block diagram illustrating an exemplary computer system as may be used in connection with various embodiments described herein.

FIG. 7 is a block diagram illustrating an exemplary computer system 550 that may be used in connection with the various embodiments described herein. For example, the computer system 550 may be used in conjunction with a firewall, a controller server, or an agent device as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for interrogating a target server hosting a website or an application, the target server accessible for data communication via one or more data communication networks, comprising:
    an agent device connected to a private network, the agent device having a data storage area and a processor;
    an agent module stored in the data storage area of the agent device, the agent module configured to be executed by the processor on the agent device;
    a controller server communicatively coupled with said agent module via an external network and the private network, wherein communications between the controller server and the agent module pass through a security system of said private network, the controller server configured to receive monitoring messages from said agent module;
    a target server communicatively coupled with said agent module via one or more data communication networks, wherein the agent module is configured to send a message to the controller server, the message comprising a unique identifier for the agent module, the agent module further configured to receive a responsive message from the controller server, parse the responsive message to obtain a sequence of instructions, and execute the sequence of instructions to interrogate the target server.

2. The system of claim 1, comprising a plurality of agent modules deployed in the private network.

3. The system of claim 1, wherein the target website comprises an application.

4. The system of claim 1, wherein the message sent to the controller server is a hyper text transfer protocol (HTTP) message.

5. The system of claim 4, wherein the HTTP message is a GET message.

6. The system of claim 1, wherein the responsive message is an HTTP message.

7. The system of claim 1, wherein the sequence of instructions comprises interpreted instructions.

8. The system of claim 1, wherein the sequence of instructions comprises operating system commands.

9. The system of claim 1, wherein the sequence of instructions comprises compiled instructions.

10. The system of claim 1, wherein the agent module is configured to dynamically generate a unique agent module identifier and provide the agent module identifier to the controller server.

11. The system of claim 1, wherein the message from the agent module to the controller server comprises the unique agent module identifier.

12. The system of claim 1, wherein the one or more data communication networks communicatively coupling the target server with the agent module consists of the private network.

13. The system of claim 1, wherein the one or more data communication networks communicatively coupling the target server with the agent module comprises the private network and the external network.

14. A computer implemented method for interrogating a target server hosting a website or an application, the target server accessible for data communication via one or more data communication networks, comprising:
    receiving a request from an agent module, the agent module located within a private network and communicatively coupled with a controller server via the private network and an external network and the agent module communicatively coupled with a target server via the private network, the request comprising an identifier that uniquely identifies the agent module;
    obtaining an instruction set for the agent module, the instruction set comprising executable commands;
    providing the instruction set to the agent module via the external network and the private network; and
    receiving information from the agent in response to the agent's execution of the executable commands in said instruction set.

15. The method of claim 14, wherein periodic requests are received from the agent module.

16. The method of claim 15, wherein the periodic requests are received approximately every minute.

17. The method of claim 14, wherein a failure is identified if an instruction set is sent to the agent module a predetermined number of times without receiving information from the agent indicating success.

18. The method of claim 14, further comprising comparing the information received from the agent to information received from one or more other agents, wherein each of the other agents is located outside of the private network.

19. A computer implemented method for interrogating a target server hosting a website or an application, the target server accessible for data communication via a private network, comprising:
    providing an agent module installed on an agent device located on the private network, the agent module configured to send and receive communications with a controller server located outside of the private network, the agent module further configured to send and receive communications with a target server via the private network;

sending a hyper text transfer protocol (HTTP) message from the agent module to the controller server, the request comprising a unique identifier for the agent module;

receiving at the agent module an HTTP response from the external server, the HTTP response comprising a set of instructions in a content portion of the HTTP response;

parsing the HTTP response at the agent module to obtain the set of instructions, the set of instructions comprising target server interrogation instructions;

executing the target server interrogation instructions by the agent module; and sending responsive target server interrogation information from the agent module to the controller server.

20. The method of claim 19, wherein the HTTP message from the agent module to the controller server is an HTTP POST message.

21. The method of claim 19, wherein the set of instructions comprises interpreted instructions.

22. The method of claim 19, wherein the set of instructions comprises compiled instructions.

23. The method of claim 19, wherein the target server interrogation instructions carry out monitoring of a website.

24. The method of claim 19, wherein the target server interrogation instructions carry out monitoring of an application.

25. The method of claim 19, wherein the target server interrogation instructions carry out testing of a website.

26. The method of claim 19, wherein the target server interrogation instructions carry out testing of an application.

* * * * *